United States Patent
Gopal et al.

(10) Patent No.: US 11,496,881 B2
(45) Date of Patent: Nov. 8, 2022

(54) MANAGING MSIM CONCURRENT ACTIVITIES

(71) Applicant: QUALCOMM Incorporated, San Diego, CA (US)

(72) Inventors: Thawatt Gopal, San Diego, CA (US); Qingxin Chen, San Diego, CA (US); Sridhar Bandaru, Westminster, CO (US); Sunil K C, Frederick, CO (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/069,491

(22) Filed: Oct. 13, 2020

(65) Prior Publication Data

US 2021/0112399 A1 Apr. 15, 2021

Related U.S. Application Data

(60) Provisional application No. 62/914,946, filed on Oct. 14, 2019.

(51) Int. Cl.
*H04L 25/02* (2006.01)
*H04W 8/18* (2009.01)
(Continued)

(52) U.S. Cl.
CPC ........... *H04W 8/183* (2013.01); *H04L 5/0051* (2013.01); *H04L 25/0226* (2013.01); *H04W 24/08* (2013.01); *H04W 24/10* (2013.01)

(58) Field of Classification Search
CPC ..... H04W 8/183; H04W 24/08; H04W 24/10; H04W 88/06; H04L 5/0051;
(Continued)

(56) References Cited

U.S. PATENT DOCUMENTS 8,934,852 B2  1/2015 Yan et al.
8,942,772 B2  1/2015 Yan et al.
(Continued)

FOREIGN PATENT DOCUMENTS

CN       110233656 A  *  9/2019
KR     20200104665 A  *  9/2020  ........... H04B 1/3816
WO  WO-2019222954 A1 * 11/2019  ........... H04W 60/005

OTHER PUBLICATIONS

Intel CorporatiOn: "Intel Views on Release-17", 3GPP TSG RAN Meeting #84, 3GPP Draft; RP-191406-Intel-View on REL-17, 3rd Generation Partnership Project (3GPP), Mobile Competence Centre; 650, Route Des Lucioles; F-06921 Sophia-Antipolis Cedex; France, No. Newport Beach, USA; Jun. 3, 2019-Jun. 6, 2019, Jun. 2, 2019 (Jun. 2, 2019), 36 Pages, XP051748335, Retrieved from the Internet: URL: http://www.3gpp.org/ftp/Meetings%5F3GPP%5FSYNC/RAN/Docs/RP%2D191406%2Ezip [retrieved on Jun. 2, 2019] slide 15 and 16.
(Continued)

*Primary Examiner* — Said M Elnoubi
(74) *Attorney, Agent, or Firm* — Dalei Dong; Procopio, Cory, Hargreaves & Savitch LLP

(57) ABSTRACT

A method, a computer-readable medium, and an apparatus are provided for wireless communication at a user equipment (UE). The apparatus determines that a first subscriber identity module (SIM) and a second SIM of the UE share a cross switch and determines whether to modify concurrent operation of the first SIM or the second SIM based, at least in part, on a determination that the first SIM and the second SIM of the UE share the cross-switch. The concurrent operation of the first SIM and the second SIM may include the first SIM performing SRS antenna switching and the second SIM performing an idle mode activity.

30 Claims, 11 Drawing Sheets

(51) Int. Cl.
*H04W 24/08* (2009.01)
*H04W 24/10* (2009.01)
*H04L 5/00* (2006.01)

(58) Field of Classification Search
CPC ... H04L 25/0226; H04L 5/0023; H04L 5/001;
H04L 5/008; H04L 5/0098; H04L 5/14;
H04L 5/0048; H04M 1/0202; H04M
1/72448
See application file for complete search history.

(56) References Cited

U.S. PATENT DOCUMENTS

| | | |
|---|---|---|
| 9,070,974 B2 | 6/2015 | Hu et al. |
| 9,118,108 B2 | 8/2015 | He et al. |
| 9,231,302 B2 | 1/2016 | He et al. |
| 9,257,744 B2 | 2/2016 | He et al. |
| 9,287,953 B2 | 3/2016 | Ngai et al. |
| 9,344,174 B2 | 5/2016 | Ngai et al. |
| 9,601,828 B2 | 3/2017 | He et al. |
| 9,680,219 B2 | 6/2017 | Filipovic et al. |
| 9,819,080 B2 | 11/2017 | He et al. |
| 2013/0308562 A1 | 11/2013 | Matin et al. |
| 2016/0316378 A1* | 10/2016 | Su .................. H04W 24/02 |
| 2018/0184309 A1 | 6/2018 | Bhardwaj et al. |
| 2019/0305918 A1* | 10/2019 | Siomina ............ H04W 76/36 |

OTHER PUBLICATIONS

International Search Report and Written Opinion—PCT/US2020/055517—ISA/EPO—dated Jan. 28, 2021.

* cited by examiner

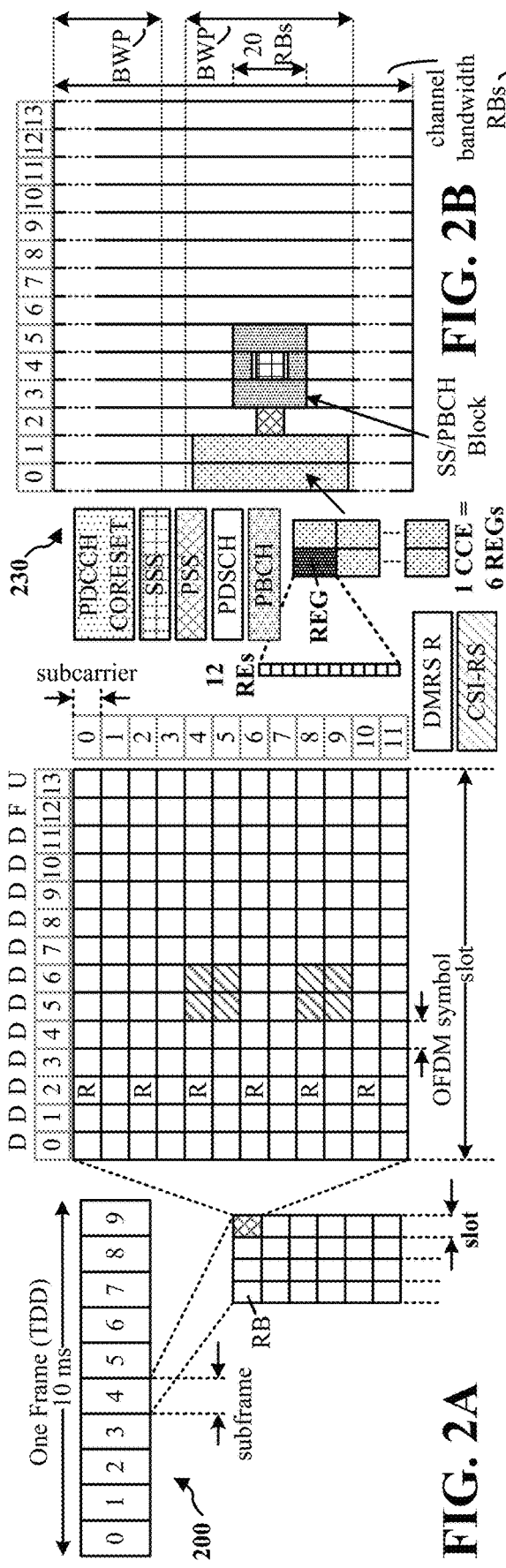
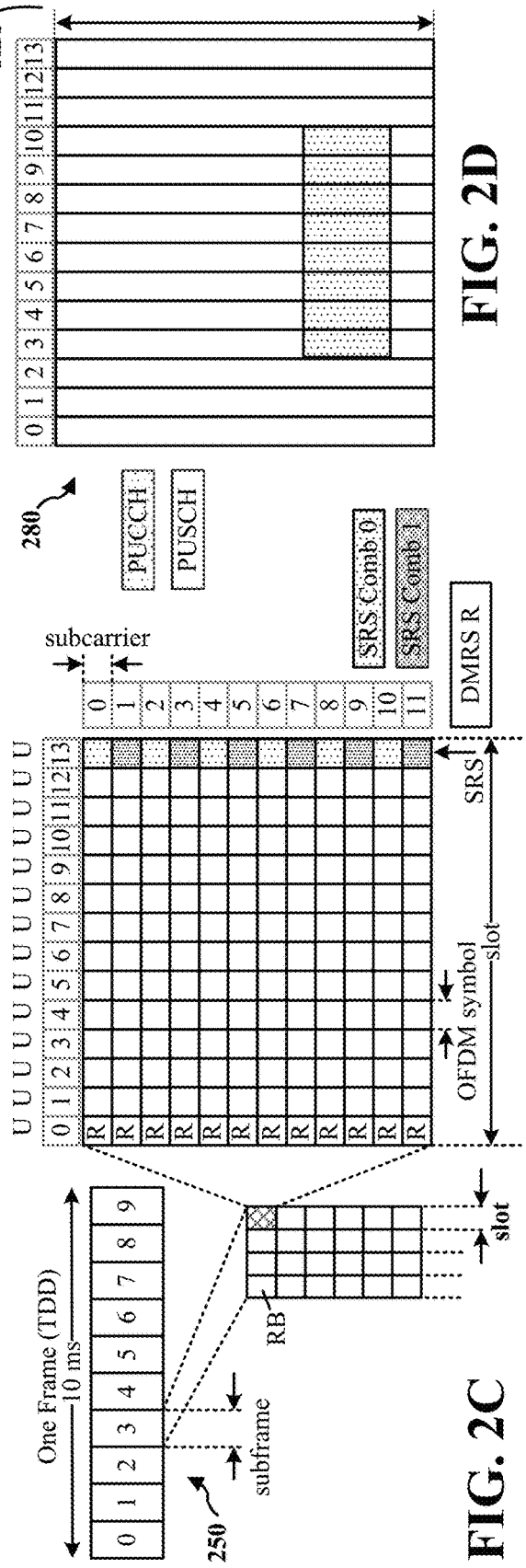
FIG. 2A
FIG. 2B
FIG. 2C
FIG. 2D

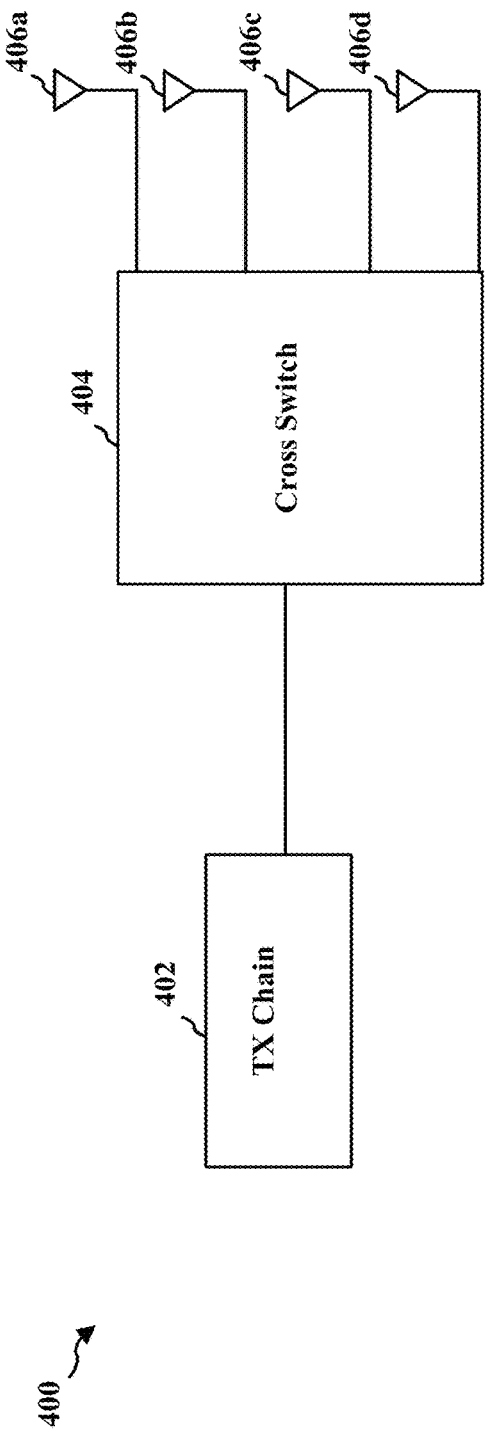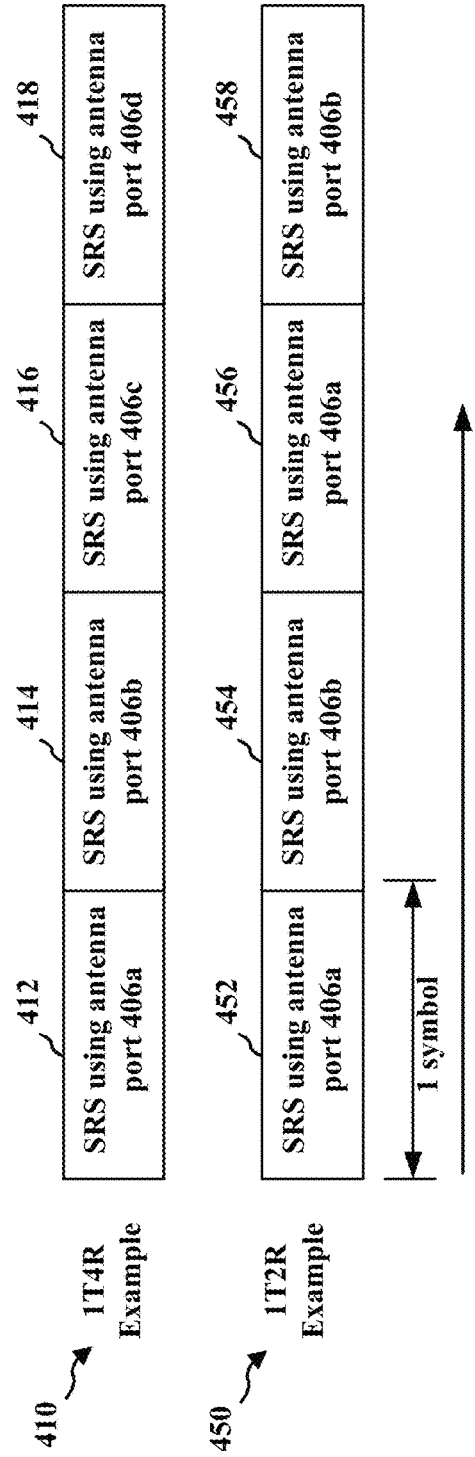
FIG. 4A
FIG. 4B

MANAGING MSIM CONCURRENT ACTIVITIES

CROSS REFERENCE TO RELATED APPLICATION

This application claims the benefit of U.S. Provisional Application Ser. No. 62/914,946, entitled "Managing MSIM Concurrent Activities" and filed on Oct. 14, 2019, which is expressly incorporated by reference herein in its entirety.

TECHNICAL FIELD

The present disclosure relates generally to communication systems, and more particularly, to wireless communication based on multiple subscriber identity modules (MSIMs). Certain embodiments enable and provide techniques for modifying concurrent MSIM operations such that potential operation performance affects are minimized or reduced given that performance degradation may occur.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may be configured to operate using more than one subscriber identity module (SIM). The UE may perform concurrent communication activities for multiple SIMs. Operations utilizing multiple SIMs may be referred to as multi-SIM (MSIM) operation. MSIM operation may occur in several manner. Some MSIM operation can be fully concurrent, e.g. with an activity for one SIM being performed at a time that overlaps with a different activity for another SIM. Some communication for one SIM may degrade activities that are performed concurrently for the other SIM. For example, sounding reference signal (SRS) antenna switching for a first SIM may degrade performance of idle mode activities for a second SIM.

The present disclosure provides deployments, implementations, and techniques for managing MSIM operations. Management of MSIM operations can be modified to avoid degradation of SIM performance during concurrent operation (e.g., degradation of one SIM's performance due to another SIM's operations) and/or to minimize non-optimal performance during concurrent SIM operations. In some examples, a UE may detect whether a first SIM and a second SIM will share a cross-switch and limiting SRS antenna switching if the first SIM and the second SIM will share a cross-switch. In some examples, the UE may include a transceiver management component that is configured to limit concurrent operation of the first SIM and the second SIM to avoid degradation to activities of one of the SIMs.

In an aspect of the disclosure, a method, a computer-readable medium, and an apparatus are provided for wireless communication. Some implementations can occur at a UE. In some apparatus deployments, a UE can determine that a first SIM and a second SIM of the UE share a cross switch. Additionally, or alternatively, a UE can determine whether to modify concurrent SIM operations (e.g., to restrict concurrent operation of the first SIM or the second SIM based). Modification of SIM operations may be based, at least in part, on a determination that the first SIM and the second SIM of the UE share the cross-switch.

In some aspects, various concurrent operation modes and antenna and/or antenna switching features can be utilized. For example, concurrent operation of a first SIM and a second SIM may include the first SIM performing sounding reference SRS antenna switching and the second SIM performing an idle mode activity. In some other examples, the UE may determine whether to modify concurrent operation of the first SIM or the second SIM based on an operating band (e.g., a frequency range) for the first SIM. In some examples, the UE may determine whether to modify and/or modify concurrent operation of the first SIM or the second SIM based on a number of antennas used (e.g., used for SRS antenna switching). In some examples, the UE may determine whether to modify concurrent operation of the first SIM or the second SIM based on an activity performed by the second SIM. In some examples, the UE may modify the SRS antenna switching by the first SIM if the second SIM is performing at least one of: monitoring for a page in an idle mode; performing a cell acquisition; performing a measurement; or receiving system information. In some examples, the UE may modify the idle mode activity performed by the second SIM based on the idle mode activity having a lower priority than the SRS antenna switching.

In some examples, the UE may indicate to the first SIM to suspend the SRS antenna switching from a current antenna for a period of time. In some examples, the UE may indicate to the first SIM to resume the SRS antenna switching when the second SIM has completed the idle mode activity. In some examples, the UE may provide the first SIM with a start time for suspending the SRS antenna switching and an end time for resuming the SRS antenna switching.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, according to some embodiments.

FIG. 4A is an example diagram of UE components 400 for SRS transmission including antenna switching, according to some embodiments.

FIG. 4B illustrates example patterns for SRS antenna switching, according to some embodiments.

DETAILED DESCRIPTION

Figure 1:
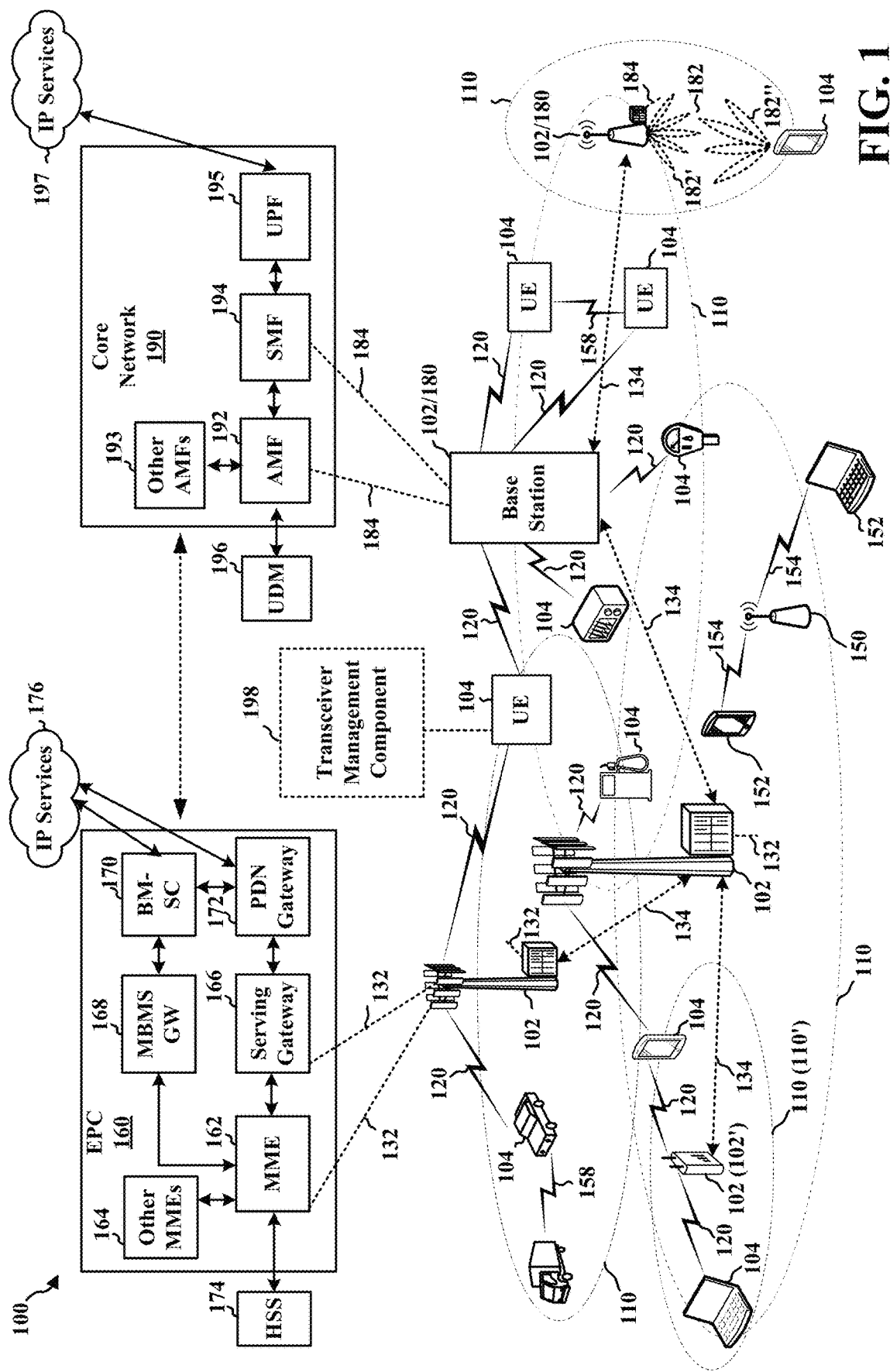
FIG. 1 is a diagram illustrating an example of a wireless communications system and an access network, according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

A UE may be configured to operate using more than one subscriber identity module (SIM). The UE may perform concurrent communication activities for multiple SIMs. Operations utilizing multiple SIMs may be referred to as multi-SIM (MSIM) operation. MSIM operation may occur in several manner. Some MSIM operation can be fully concurrent, e.g. with an activity for one SIM being performed at a time that overlaps with a different activity for another SIM. Some communication for one SIM may degrade activities that are performed concurrently for the other SIM. For example, sounding reference signal (SRS) antenna switching for a first SIM may degrade performance of idle mode activities for a second SIM.

The present disclosure provides deployments, implementations, and techniques for managing MSIM operations. Management of MSIM operations can be modified to avoid degradation of SIM performance during concurrent operation (e.g., degradation of one SIM's performance due to another SIM's operations) and/or to minimize non-optimal performance during concurrent SIM operations. In some examples, a UE may detect whether a first SIM and a second SIM will share a cross-switch and limiting SRS antenna switching if the first SIM and the second SIM will share a cross-switch. In some examples, the UE may include a transceiver management component that is configured to limit concurrent operation of the first SIM and the second SIM to avoid degradation to activities of one of the SIMs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions, such as directions 182'. The UE 104 may receive the beamformed signal from the base station 180 in one or more receive directions, such as directions 182". The UE 104 may also transmit a beamformed signal to the base station 180 in one or more transmit directions, such as directions 182". The base station 180 may receive the beamformed signal from the UE 104 in one or more receive directions, such as 182'. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Components making up a wide area network may take a variety of labels or names.

For example, a base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. As mentioned herein, base stations can serve a variety of communication devices to facilitate network connectivity.

Communication devices can include a variety of user equipment (UE) devices. UE devices can run the spectrum from small to large devices and may be remote and/or stationary. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle or vehicle component, an electric meter, a gas pump, a large or small kitchen appliance, a healthcare device, an implant, a sensor/actuator, a display, entertainment device, computing device, gaming device, augmented/virtual reality device, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to operate using one or multiple SIMs. As shown a UE can include a first SIM and a second SIM. SIMs can be physical, tangible components, virtual electronic SIMs, and/or a combination thereof. Though not illustrated any UE may be equipped with any number of SIMs and principles discussed here can be applied for managing concurrent operations of one or more SIMs configured to operate for a UE. The UE 104 may include a transceiver management component 198. The transceiver management component can be configured to determine whether a first SIM and a second SIM share a cross-switch. In addition, the transceiver management component can determine whether to modify and/or restrict concurrent operation of the first SIM and the second SIM. SIM management can be, based, at least in part, on a determination that the first SIM and the second SIM of the UE 104 share the cross switch. Other factors may also be utilized for SIM management.

That is the transceiver management component can consider a variety of inputs for SIM management. For example, concurrent operation of a first SIM and a second SIM may include the first SIM performing SRS antenna switching and the second SIM performing an idle mode activity. In some examples, the transceiver management component 198 may determine whether to restrict the concurrent operation of the first SIM or the second SIM based on an operating band for the first SIM. In some examples, the transceiver management component 198 may determine whether to restrict the concurrent operation of the first SIM or the second SIM based on a number of antennas used for the SRS antenna switching. In some examples, the transceiver management component 198 may determine whether to restrict the concurrent operation of the first SIM or the second SIM based on an activity performed by the second SIM. The transceiver management component 198 may indicate to the first SIM to suspend SRS antenna switching away from a current antenna for a period of time. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
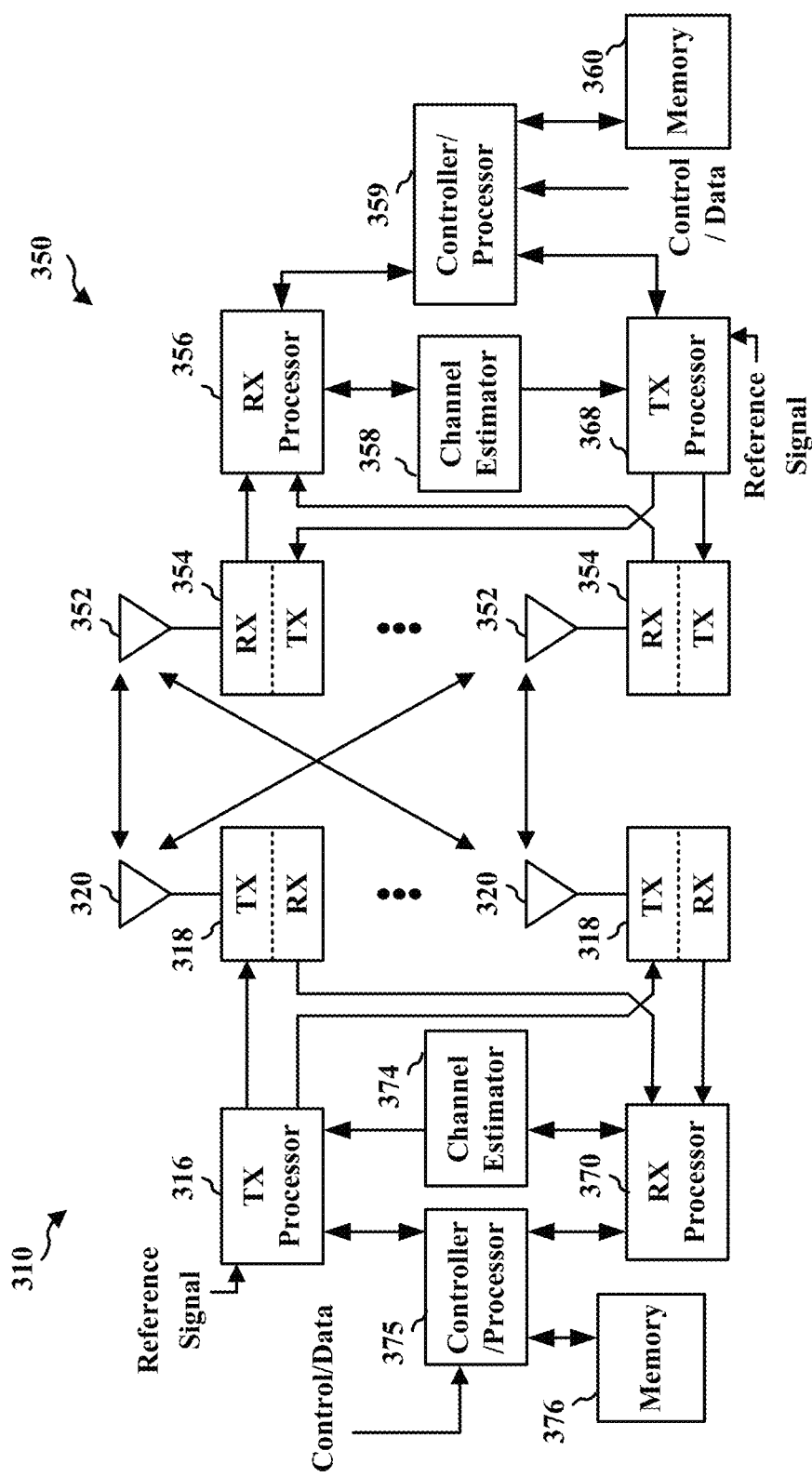
FIG. 3 is a diagram illustrating an example of a base station and a UE in an access network, according to some embodiments.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the transceiver management component 198 of FIG. 1.

A UE may transmit a sounding reference signal (SRS) by transmitting a known signal using an antenna of the UE. The SRS may be used to help calibrate a Multiple Input Multiple Output (MIMO) channel or improve downlink signal-to-noise ratio (SNR). For example, the base station receiving the SRS may use the SRS to perform channel estimation and to determine precoding for MIMO for the UE.

In some examples, the UE may perform SRS antenna switching by switching between multiple antenna ports to transmit the SRS. By switching between multiple antenna ports, the UE enables the base station to perform a channel estimation for different antenna ports of the UE. A UE may perform antenna switching in various ways depending on parameters configured by the base station. For example, the base station may configure the UE to perform SRS antenna switching by sending an RRC message to the UE.

The antenna switching may be based on 1T2R, 1T4R, or 2T4R. The term "1T2R" may correspond to one transmission chain at the UE that transmits SRS on two antenna. The term "1T4R" may correspond to one transmission chain at the UE that transmits SRS on four antennas. The term "2T4R" may correspond to sending the SRS symbol on two separate antennas at the same time based on having two transmitters for uplink MIMO. Some UEs may not support uplink MIMO. Some frequency bands, such as some NR frequency bands, may not have support for uplink MIMO transmissions from a UE. The SRS transmitted by the UE may include aperiodic SRS, semi-persistent SRS, or periodic SRS.

FIG. 4A illustrates an example diagram of UE components 400 for SRS transmission including antenna switching. The UE components 400 may include a transmission chain 402 that uses a cross switch 404 to switch between transmitting an SRS using antennas 406a, 406b, 406c, and 406d in different symbols.

FIG. 4B illustrates an example 1T4R pattern 410 and 1T2R pattern 450 for SRS antenna switching. The UE may transmit the 1T4R pattern 410 of SRS symbols using the antennas 406a, 406b, 406c, 406d illustrated in FIG. 4A. For example, in a first symbol 412, the UE may transmit the SRS using antenna 406a. In a second symbol, 414, the UE may switch from antenna 406a to antenna 406b to transmit the SRS. In a third symbol, the UE may switch from antenna 406b to antenna 406c to transmit the SRS. In a fourth symbol, the UE may switch from antenna 406c to antenna 406d to transmit the SRS. In the 1T2R pattern 450, the UE may transmit the UE using antenna 406a in a first symbol 452 before switching to using antenna 406b to transmit the SRS in a second symbol 454. The UE may then return to using antenna 406a to transmit the SRS in a third symbol 456, and may switch, again, to antenna 406b to transmit the SRS in a fourth symbol 458.

Additionally, or alternatively, a UE may perform SRS carrier switching, which may include switching carriers in order to transmit SRS. SRS carrier switching may assist a base station in obtaining CSI of secondary time division duplex (TDD) cells for a UE operating based on TDD carrier aggregation (CA). In some examples, TDD CA may be for NR communication, e.g., TDD NR CA. In TDD CA, a primary cell (PCell) may exchange communication with the UE based on frequency division duplex (FDD), and a secondary cell (SCell) may exchange communication with the UE based on TDD resources. The SCell may have a downlink only configuration, and the UE may not have uplink resources allocated for the SCell. In order to enable the base station to obtain channel information for the SCell, the UE may periodically switch from uplink transmission for the PCell to transmit SRS for the SCell. The procedure of switching cells (e.g., switching carriers) in order to transmit SRS for the SCell may be referred to as SRS carrier switching.

Figure 5:
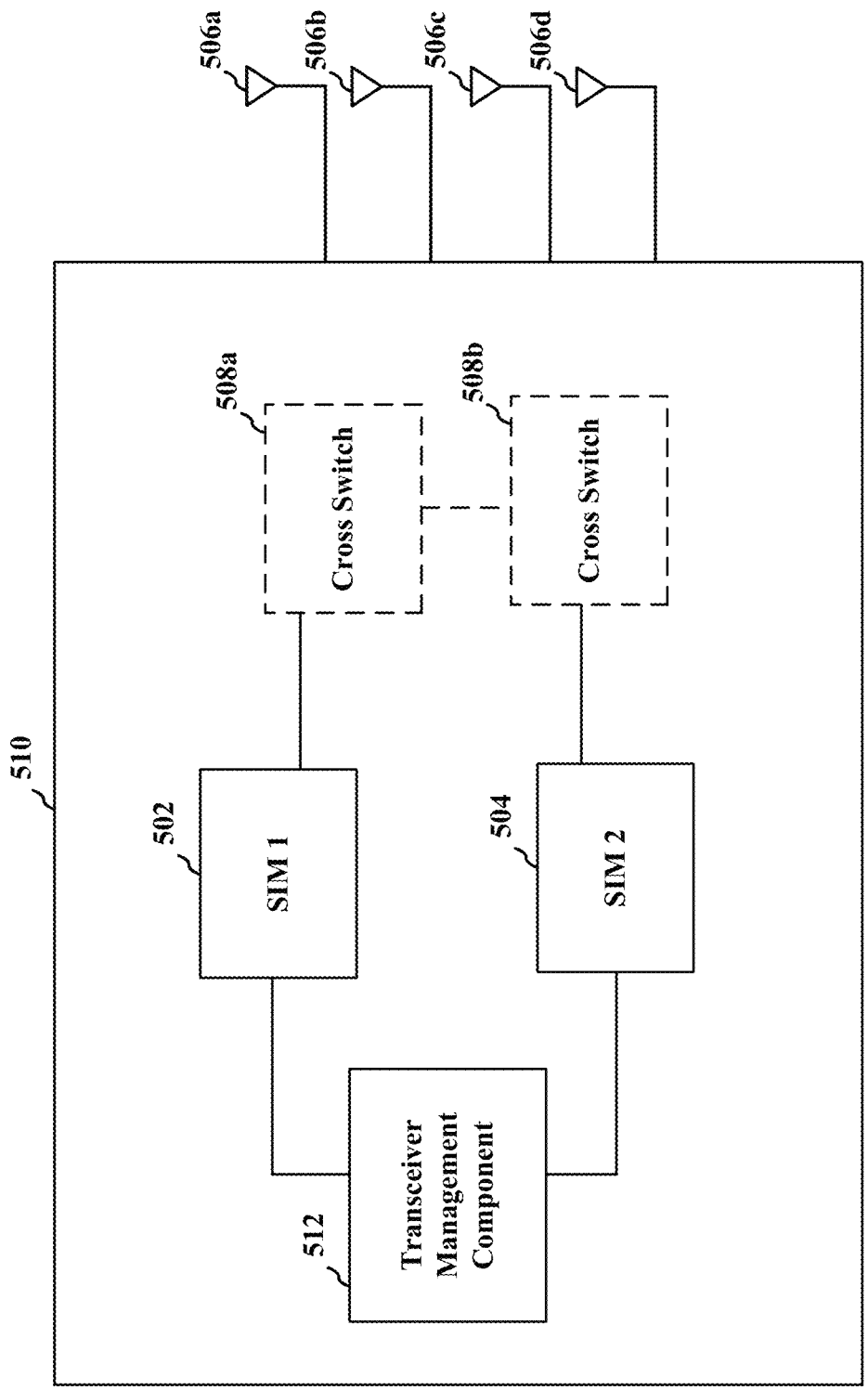
FIG. 5 is a diagram of components of a UE including a transceiver management component, according to some embodiments.

A UE may include more than one subscriber identity module (SIM). FIG. 5 illustrates an example of a UE 510 that includes a first SIM 502 and a second SIM 504. In some examples, the UE 510 may perform concurrent communication activities for multiple SIMs, such as for the first SIM 502 and the second SIM 504. Such operation may be referred to as multi-SIM (MSIM) operation. The MSIM operation may be fully concurrent, e.g. with an activity for one SIM being performed at a time that overlaps with a different activity for another SIM. The first SIM 502 may perform SRS switching, such as switching between antennas 506a, 506b, 506c, and 506d to transmit the SRS (e.g., SRS antenna switching) and/or switching between different carriers to transmit SRS (e.g., SRS carrier switching). The first SIM 502 may use a cross switch, such as 508a or 508b, to switch antennas/carriers for the SRS. The cross switch may be referred to as a radio frequency (RF) front end cross switch. In other aspects, the first SIM 502 may operate in a standalone connected mode, such as an NR sub 6 standalone connected mode. In some aspects, the first SIM 502 may operate in a dual connectivity mode, such as an Evolved Universal Terrestrial Access Network-New Radio Dual Connectivity (EN-DC) mode. The second SIM 504 may operate in a different mode, such as an idle mode. The second SIM 504 may perform idle mode activities such as monitoring or decoding pages from a base station, performing measurements, performing cell acquisition, or receiving system information from a base station, among other examples. In some aspects, the second SIM 504 may operate using the same radio access technology (RAT) as the first SIM 502. For example, the first SIM 502 and the second SIM 504 may both operate based on NR, such as NR sub 6. In other aspects, the second SIM 504 may operate using a different RAT than the first SIM 502. For example, the first SIM 502 may operate based on NR sub 6, and the second SIM 504 may operate based on LTE, WCDMA, GSM, or 1×, among other examples. In some examples, the concurrent communication for the first SIM 502 and the second SIM 504 and SIM 2 may involve downlink/uplink activities for the first SIM 502 and downlink activities for the second SIM 504.

Some operations of one SIM may degrade performance or activities of another SIM. For example, some operation of the first SIM 502 may degrade performance of the idle mode activities for the second SIM 504. A cross switch, such as cross switch 508*a*, may reconfigure connections for the first SIM 502. To perform SRS antenna switching or SRS carrier switching for the first SIM 502, the cross switch 508*a* may temporarily turn off and reconfigure to connect to a different antenna. The reconfiguration of the cross switch to switch to a different antenna for SRS transmission by the first SIM 502 may interfere with the second SIM's ability to receive and decode downlink communication. For example, the SRS antenna switching or SRS carrier switching of the first SIM 502 using the cross switch 508*a* may degrade performance of some communication activities by the second SIM 504, e.g., idle mode activities such as page decoding, measurements, cell acquisition, decoding system information, etc. For example, the SRS switching or SRS carrier switching of the first SIM 502 may interrupt the second SIM's operations that may result in a functional failure. As another example, if there is an in-flight SRS transmission by the first SIM 502, preparation by the second SIM 504 for communication activities, such as programming the RF front-end components to receive a page for the second SIM 504, may disrupt the ongoing SRS transmission by the first SIM 502. In some cases, the interruption of an on-going transmission may also cause hardware damage to the transmit power amplifiers. Depending on which SIM begins their respective activity first, the concurrent operation of both SIMs can disrupt the other SIM's procedure. Thus, the interruption may depend on which activity is already on-going, e.g., if the aspects presented herein are not used to modify the concurrent activity.

Aspects presented herein provide a way to avoid degradation of one SIM's operations or performance due to another SIM's concurrent activity. For example, SIM performance degradation of the second SIM 504 is enabled through detection of whether the first SIM 502 and the second SIM 504 share a cross-switch and limiting SRS antenna switching (e.g., based, at least in part, on the determination that the first SIM 502 and the second SIM 504 will share a cross-switch). The UE 510, or a component of the UE 510, may identify that a cross-switch will be shared between the first SIM 502 and second SIM 504. In some examples, the UE 510 may include a transceiver management component 512 that is configured to limit concurrent operation of the first SIM 502 and the second SIM 504 to avoid degradation to activities of one of the SIMs. The transceiver management component may include a common software module that communicates with both the first SIM 502 and the second SIM 504.

The transceiver management component 512 may limit concurrent operation in a variety of manners. In one example, the transceiver management component can modify (e.g., restrict, limit, not allow, or adjust) SRS antenna switching and/or SRS carrier switching by the first SIM 502, based on a determination that the first SIM 502 and the second SIM 504 share a cross switch 508*a* or 508*b*. In some examples, the transceiver management component may indicate to the first SIM 502 to suspend the SRS antenna switching or SRS carrier switching. In some examples, the transceiver management component may indicate to the first SIM 502 to resume the SRS antenna switching. In other examples, the transceiver management component may modify SRS antenna switching by the first SIM 502 based on a number of antennas used for the SRS antenna switching. In other examples, the transceiver management component may modify an activity by the first SIM further based on an operating band (e.g., frequency range) used by the first SIM 502 or the second SIM 504. In other examples, the transceiver management component may modify an activity by the first SIM further based on an activity performed by the second SIM 504. In other examples, the transceiver management component may modify an activity by the first SIM or the second SIM based on the priority levels of the activities performed by the first SIM 502 and the second SIM 504. In other examples, the transceiver management component may modify (e.g., restrict, limit, or adjust) operation of the second SIM 504.

Sharing of cross switches can be a factor in managing SIM operations. For example, the transceiver management component 512 may determine whether the SIMs will share a cross switch or whether to restrict concurrent operation of the first SIM 502 and the second SIM 504 based on an operating band used by the first SIM 502. For example, if the first SIM 502 communicates using band N41 (e.g., 2496-2690 MHz) and the second SIM 504 communicates using band N40 (e.g., 2300-2400 MHz), the transceiver management component 512 may determine that the cross-switch will be shared between the two SIMs. If both SIMs of the UE 510 are operating on a high frequency band the transceiver management component 512 may determine that a cross switch 508*a* or 508*b* will be shared between the two SIMs and that there may be a concurrency issue with the SRS antenna/carrier switching by the first SIM 502. Examples of a high band include frequency bands such as N41 or N40, or including a range between 2.1 GHz to 2.69 GHz. A middle frequency band may include bands such as N2 or N1 or a range between 960 MHz to 2.1 GHz. The transceiver management component 512 may determine the band being used by a particular SIM and may then determine for the determined band, which cross-switches are used for the operating band. The transceiver management component 512 may determine the path between the transceiver to the respective antennas, such as antennas 506*a*, 506*b*, 506*c*, and 506*d*, to determine which cross-switch is used for the operating band by the corresponding SIM.

The transceiver management component 512 may further consider the concurrent activities of the first SIM 502 and the second SIM 404 to determine whether to limit SRS antenna switching. For example, if the second SIM 504 is monitoring for pages from a base station while in an idle mode, the second SIM 504 will monitor using a paging cycle. Within each paging cycle, the UE 510 would wake up and monitor for a page message from the base station. The second SIM 504 may provide time information for the paging cycle to a central entity, such as the transceiver management component 512.

The transceiver management component 512 may detect the concurrent activities of the two SIMs and may determine whether a cross-switch is shared between the two SIMs, or whether there is a potential for activity of one SIM to cause degradation to a particular type of activity of the other SIM. In some aspects, the second SIM 504 may perform cell acquisition in a concurrent manner with SRS antenna switching by the first SIM 502. For example, the second SIM 504 may attempt to acquire a signal on a particular cell, e.g., a SS, timing information, system information to camp on a cell. The second SIM 504 may perform measurements while camped on a cell, such as neighbor measurements. The second SIM 504 may attempt to receive and decode system information messages relating to operations on a cell.

The transceiver management component 512 may apply a policy to determine whether to allow SRS antenna switching by one of multiple SIMs. In some examples, the transceiver management component 512 may not allow SRS antenna switching when the first SIM 502 and the second SIM 504 are involved in concurrent activities and when the two SIMs share a cross-switch. The transceiver management component 512 may temporarily limit or restrict the SRS antenna switching or SRS carrier switching by the first SIM 502. The first SIM 502 may be able to continue to transmit SRS using a current antenna or a subset of antennas, yet may be limited from switching to a different antenna or to a different carrier to transmit the SRS. If the two SIMs do not share a cross-switch, the transceiver management component 512 may allow the SRS antenna/carrier switching by the first SIM 502.

The UE may determine if the antennas used by the second SIM 504 will be impacted by SRS switching or the antennas used for the second SIM idle operations will impact the first SIM SRS switching. If the concurrent operation will affect the operation of one of the SIMs, the UE may determine to modify the concurrent operation of the first SIM 502 and the second SIM 504. In some cases, although SIM 1 and SIM 2 share cross-switch, the UE may determine not to suspend/resume SRS and to instead allow concurrent MSIM operation. For example, if the SIM 2 antenna or SIM 1 antenna will not be impacted by the concurrent activity, the UE may determine to not to restrict/adjust operation by one of the SIMs. For example, the UE may consider a number of antennas for the idle mode activity to account for different antenna and cross-switch RF front-end topology for different UEs. For example, in a five-antenna design topology, if the second SIM 504 uses one-antenna (e.g. ant-1 out of ant-1, 2,3,4,5) and the first SIM 502 uses four antenna (e.g. ant-2,3,4,5 out of ant-1,2,3,4,5), it may be possible under some design configurations with cross-switch sharing to allow the first SIM SRS switching concurrently with the second SIM idle mode operation without either limiting the SRS of the first SIM 502 or the idle mode operation of the second SIM 504.

In some examples, the transceiver management component 512 may restrict concurrent activity on the second SIM 504 when the first SIM 502 performs the SRS antenna switching or SRS carrier switching. For example, if the transceiver management component 512 determines that the second SIM 504 will perform an activity that has a lower priority than SRS antenna/carrier switching by the first SIM 502, the transceiver management component 512 may limit the concurrent activity by the second SIM 504.

In some examples, the second SIM 504 may operate using a single receive chain or multiple receive chains, e.g., two receive chains. The transceiver management component 512 may determine the type of SRS antenna switching performed by the first SIM 502 (e.g., 1T2R or 1T4R) and may perform an analysis of the RF front end path and cross-switch hardware to determine whether the SRS antenna switching of the first SIM 502 will impact the idle mode activity of the second SIM 504. The transceiver management component 512 may use a common RF component that abstracts the RF front end path to determine whether there is an overlap in the RF front end paths for the SIMs.

In some examples, the transceiver management component 512 may determine whether to allow SRS carrier switching by the first SIM 502 or the second SIM 504.

With MSIM full concurrency, one SIM may be in a standalone connected mode with carrier aggregation with SRS carrier switching. For example, the UE may be configured, based on the SIM, with a PCell (e.g., first carrier) that is an FDD cell and an SCell (e.g., second carrier) that a TDD downlink CA cell. In another example, the UE may be configured, based on the SIM, with a PCell (e.g., first carrier) that is a TDD cell and an SCell (e.g., second carrier) that a TDD downlink CA cell. The other SIM may perform idle mode activities such as page decoding, measurements, cell acquisition, receiving system information, etc. In some examples, one SIM may be for an NR sub 6 RAT, and the other SIM may be for a RAT based on NR sub 6, LTE, WCDMA, GSM, 1×, etc.

The transceiver management component 512 may determine whether an SRS carrier for the SIM 502 shares an RF cross switch 508*a* or 508*b* with the SIM 504. The transceiver management component 512 may further determine whether the SIM 504 is performing concurrent activities (e.g., in a dual-receive, dual SIM dual standby (DR-DSDS) mode) for which the transceiver management component 512 will restrict SRS carrier switching If the transceiver management component 512 determines that an SRS carrier for SIM 502 shares an RF front-end cross switch with the SIM 504 and also determines that the SIM 504 will perform a particular activity that overlaps with SRS carrier switching by the SIM 502, the transceiver management component 512 may not allow (e.g., may restrict or limit) the SRS carrier switching. For example, the UE may skip SRS carrier switching to transmit SRS for an SCell on a different carrier if the SIM 504 shares an RF cross switch with the SIM 502 for the SRS carrier and the SIM 504 will perform a concurrent activity (e.g., any of monitoring for a page for the SIM 504, performing cell acquisition for the SIM 504, performing measurements for the SIM 504, receiving system information for the SIM 504, etc.). In some examples, the activities for which the SRS carrier switching on the SIM 502 is restricted may be monitoring for a non-designated data subscriber (nDDS) page for the SIM 504, performing nDDS acquisition for the SIM 504, performing nDDS measurements for the SIM 504, receiving nDDS system information for the SIM 504.

If the transceiver management component 512 determines that there is a shared cross-switch, the transceiver management component 512 may not allow the SRS carrier switching (e.g., for the SIM 502). If the transceiver management component 512 determines that there is not a shared cross-switch, the transceiver management component 512 may allow the SRS carrier switching (e.g., for the SIM 502).

Figure 6:
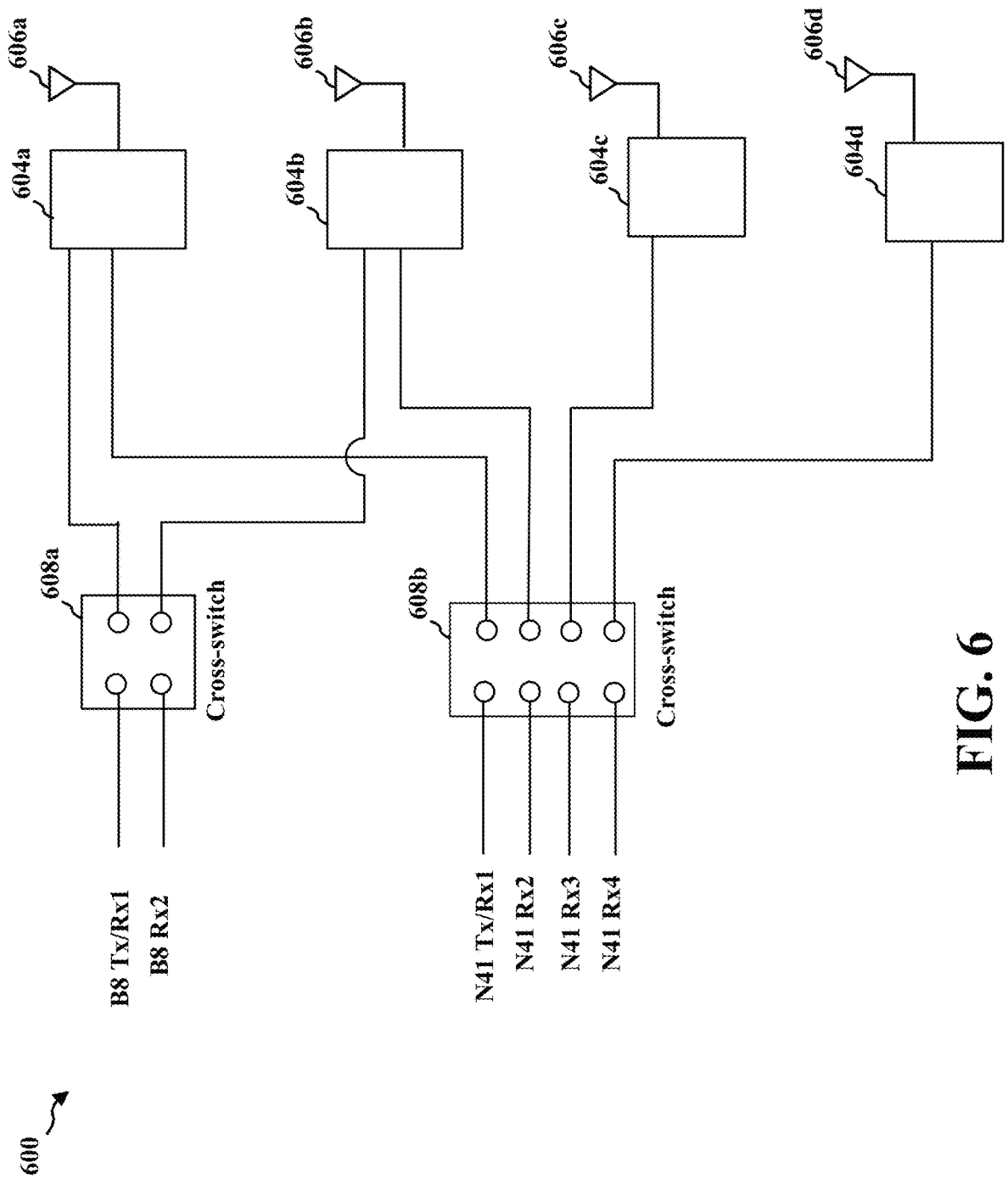
FIG. 6 is an example front end diagram for a UE that is capable of operating using multiple SIMs, according to some embodiments.

FIG. 6 illustrates an example front end diagram 600 for a UE that is capable of operating using multiple SIMs. In FIG. 6, the front end diagram includes four antennas 606*a*, 606*b*, 606c, and 606d and multiple independent cross-switches 608a and 608b. The UE may include antenna N-plexers 604a, 604b, 604c, and 604d or other similar components that receive communication for multiple frequency bands using a single antenna. FIG. 6 illustrates example paths for a first SIM that communicates using an N41 channel that corresponds to a frequency range including 2.6 GHz. The second SIM may use a B8 channel that corresponds to a frequency range including 850 MHz. Although a first SIM (such as SIM 502 in FIG. 5) and the second SIM (such as SIM 504 in FIG. 5) may share the four antennas 606a, 606b, 606c, and 606d, the two SIMs can use independent cross-switches based on the front end diagram in FIG. 6. For example, the B8 channel front end for transmission and reception in FIG. 6 is routed to cross-switch 608a and uses antennas 606a and 606b. The N41 channel front end for transmission and reception is routed to cross-switch 608b and uses antennas 606a, 606b, 606c, and 606d. The first SIM (such as SIM 502) using the N41 channel for 1T4R SRS antenna switching (e.g., using the four antennas 606a, 606b, 606c, and 606d) or 1T2R SRS antenna switching using two of the four antennas will not impact reception of the second SIM (e.g., SIM 504) using the B8 channel because the SRS antenna switching is performed using an independent cross-switch. Even though the first SIM may use antenna 606a or antenna 606b, the switch to the antenna is performed by cross-switch 608b and will not degrade reception for the second SIM using the other cross-switch 608a.

The example in FIG. 6 that includes four antennas and two cross-switches is merely to illustrate the concept of operation using independent cross-switches. The concepts may be similarly applied to any number of antennas included in a UE and any number of cross-switches included in a UE. The concepts may also be applied for channels having different frequency ranges that the N41 band and the B8 band used to illustrate the principle of management of concurrent MSIM activities.

Figure 7:
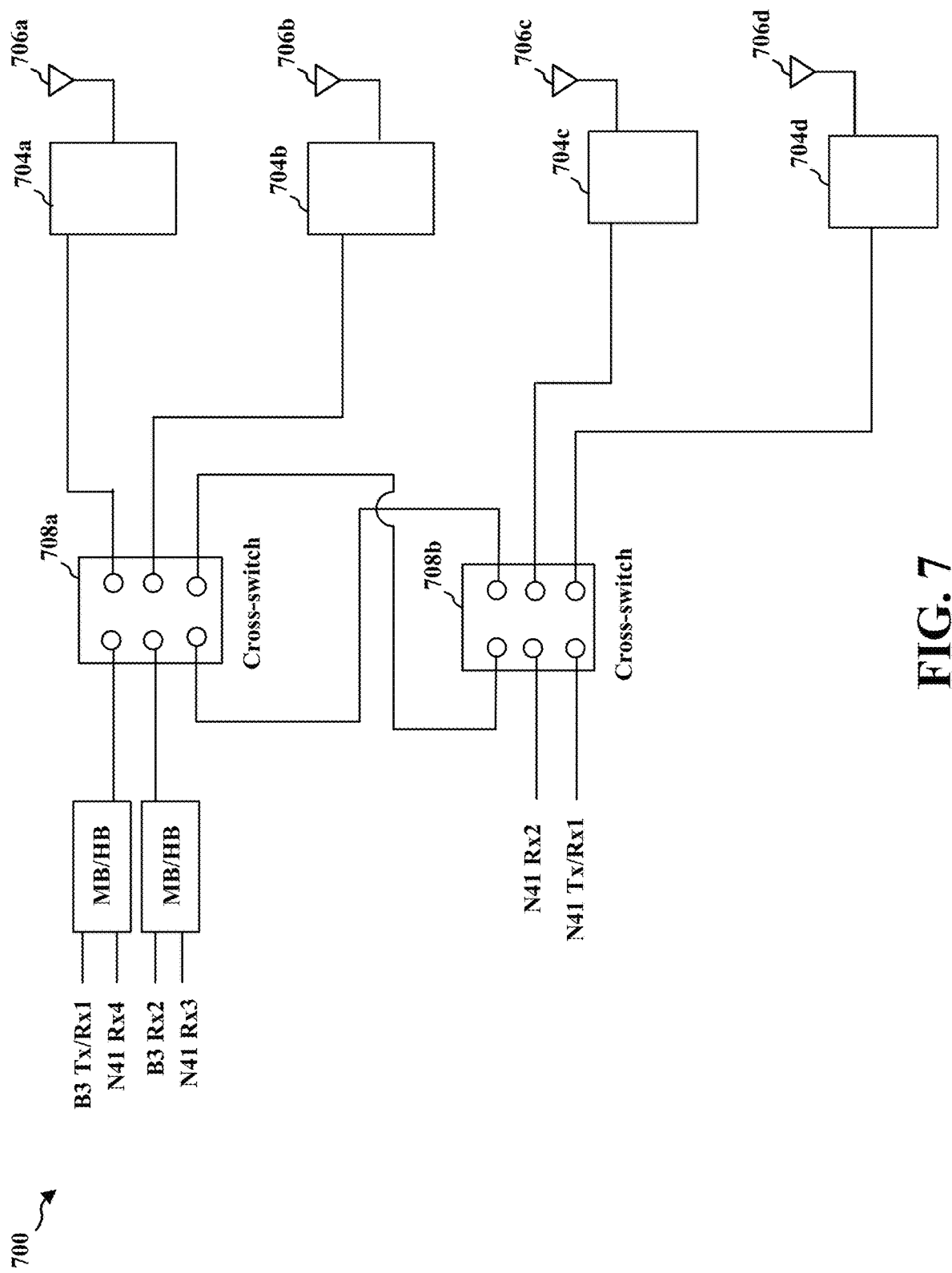
FIG. 7 is an example front end diagram for a UE that is capable of operating using multiple SIMs, according to some embodiments.

FIG. 7 illustrates an example front end diagram 700 for a UE that is capable of operating using multiple SIMs. In FIG. 7, the front end diagram includes four antennas 706a, 706b, 706c, and 706d and multiple independent cross-switches 708a and 708b coupled to the antennas via antenna N-plexers 704a, 704b, 704c, and 704d or other similar components that receive communication for multiple frequency bands using a single antenna. FIG. 7 illustrates example paths for a first SIM that communicates using an N41 channel that corresponds to a frequency range including 2.6 GHz. The second SIM may use a B3 channel that corresponds to a frequency range including 1.8 GHz. In contrast to the independent cross-switches in FIG. 6, in FIG. 7, the front end design includes dependent cross switches. The front end for the B3 band Rx1 for the second SIM is routed to cross switch 708a that is cascaded with cross switch 708b. The front end for transmission and reception of the N41 band (e.g., N41 Tx/Rx1) for the first SIM is routed to cross switch 708b that is cascaded with cross switch 708a. Based on the topology of the RF front end of the UE, there is a potential for a shared cross switch for communication for the first SIM and communication for the second SIM. If the first SIM uses the N41 band to perform 1T2R SRS antenna switching using 706c and 706d, the SRS antenna switching will not impact reception for the second SIM using the B3 band because the switching between antenna 706c and 706d is performed by cross switch 708b, which does not impact reception for the B3 band. However, if the first SIM uses the N41 channel for 1T4R SRS antenna switching (e.g., using the four antennas 706a, 706b, 706c, and 706d), the SRS antenna switching across the antennas may have an impact on reception of the second SIM using the B3 channel because switching to antenna 706a and 706b involves cross switch 708a that is shared with the second SIM using the B3 channel. Switching to antenna 706a or 706b for the first SIM using the N41 channel may causes interruptions for reception by the second SIM on the B3 channel (e.g., B3 Rx1 r B3 Rx2).

The example in FIG. 7 that includes four antennas and two cross-switches is merely to illustrate the concept of operation using dependent cross-switches. The concepts may be similarly applied to any number of antennas included in a UE and any number of cross-switches included in a UE. The concepts may also be applied for channels having different frequency ranges that the N41 band and the B3 band used to illustrate the principle of management of concurrent MSIM activities.

Management of concurrent MSIM can come about in a number of manners using various transceiver management approaches, components, and techniques. In one example, the transceiver management component 512 in FIG. 5, may allow unrestricted, concurrent MSIM operation for a first SIM and a second SIM based on a front end topology in which the first SIM and the second SIM do not share a cross switch, such as in FIG. 6. The transceiver management component 512 may, at least temporarily, restrict concurrent MSIM operation based on the topology in FIG. 7 in which the first SIM and the second SIM may share a cross switch 708a.

If the transceiver management component 512 determines to modify (e.g., limit or restrict) concurrent MSIM operation of one of the SIMs, it can do so in a variety of manners. In one example, the transceiver management component can limit SRS antenna switching by the first SIM 502, transceiver management component 512 may inform the first SIM 502 when to start suspending the SRS antenna switching away from current antenna, e.g., primary antenna (PRX) currently used for uplink data PUSCH transmission. The transceiver management component 512 may indicate to the first SIM 502 to suspend antenna switching for SRS when there is an activity of the second SIM 504 that may be impacted by the antenna switching. For example, the transceiver management component 512 may indicate to the first SIM 502 to suspend antenna switching while the second SIM 504 performs an idle mode activity such as monitoring for a page, cell acquisition, performing measurements, receiving system information, etc. The transceiver management component 512 may indicate to the first SIM 502 when to resume SRS antenna switching, e.g., when the second SIM idle mode activity is completed. The aspects presented herein may be applied to each of the types of SRS antenna switching. Therefore, a suspend notification may limit periodic SRS antenna switching, aperiodic SRS antenna switching, etc. for any incoming request to perform antenna switching for SRS, whether periodic or aperiodic.

Table 1 illustrates an MSIM concurrency frequency band combination table showing a variety of sample operation band combinations. In particular, the table sets forth a first SIM using band N41 concurrently with a second SIM's communication using various frequency bands and radio access technologies (RATs). The shaded columns in Table 1 are MSIM bands that may include cross switch sharing between the first SIM and the second SIM. For example, the highlighted MSIM bands may involve SRS antenna switching for a first SIM using a cross switch that is shared with a second SIM.

TABLE 1

| SIM 1 | | SIM 2 on L/W/G/1x | | | | | | | | | | | | |
|---|---|---|---|---|---|---|---|---|---|---|---|---|---|---|
| ENDC | | LTE Bands | | | | | | | | WCDMA | | GSM | | 1x |
| LTE + NRsub6 | | B1 | B3 | B8 | B41/B38 | B39 | B34 | B5 | B40 | B8 | B1 | B8 | B3 | B5 |
| B38 A (4Rx) | N41 A | 2 $Rx^1$ | 4 $Rx^2$ | 2 $Rx^2$ | 2 $Rx^{3,4}$ | 4 $Rx^2$ | 2 $Rx^1$ | 2 $Rx^5$ | 2 $Rx^5$ | 2 $Rx^2$ | 2 $Rx^1$ | 2 $Rx^2$ | 2 $Rx^1$ | 2 $Rx^5$ |
| B39 A (4Rx) | N41 A | 2 $Rx^1$ | 4 $Rx^2$ | 2 $Rx^2$ | 2 $Rx^{3,4}$ | 4 $Rx^2$ | 2 $Rx^1$ | 2 $Rx^5$ | 2 $Rx^5$ | 2 $Rx^2$ | 2 $Rx^1$ | 2 $Rx^2$ | 2 $Rx^1$ | 2 $Rx^5$ |
| B40 A (4Rx) | N41 A | 2 $Rx^1$ | 4 $Rx^2$ | 2 $Rx^2$ | 2 $Rx^{3,4}$ | 4 $Rx^2$ | 2 $Rx^1$ | 2 $Rx^5$ | 2 $Rx^5$ | 2 $Rx^2$ | 2 $Rx^1$ | 2 $Rx^2$ | 2 $Rx^1$ | 2 $Rx^5$ |

Figure 8:
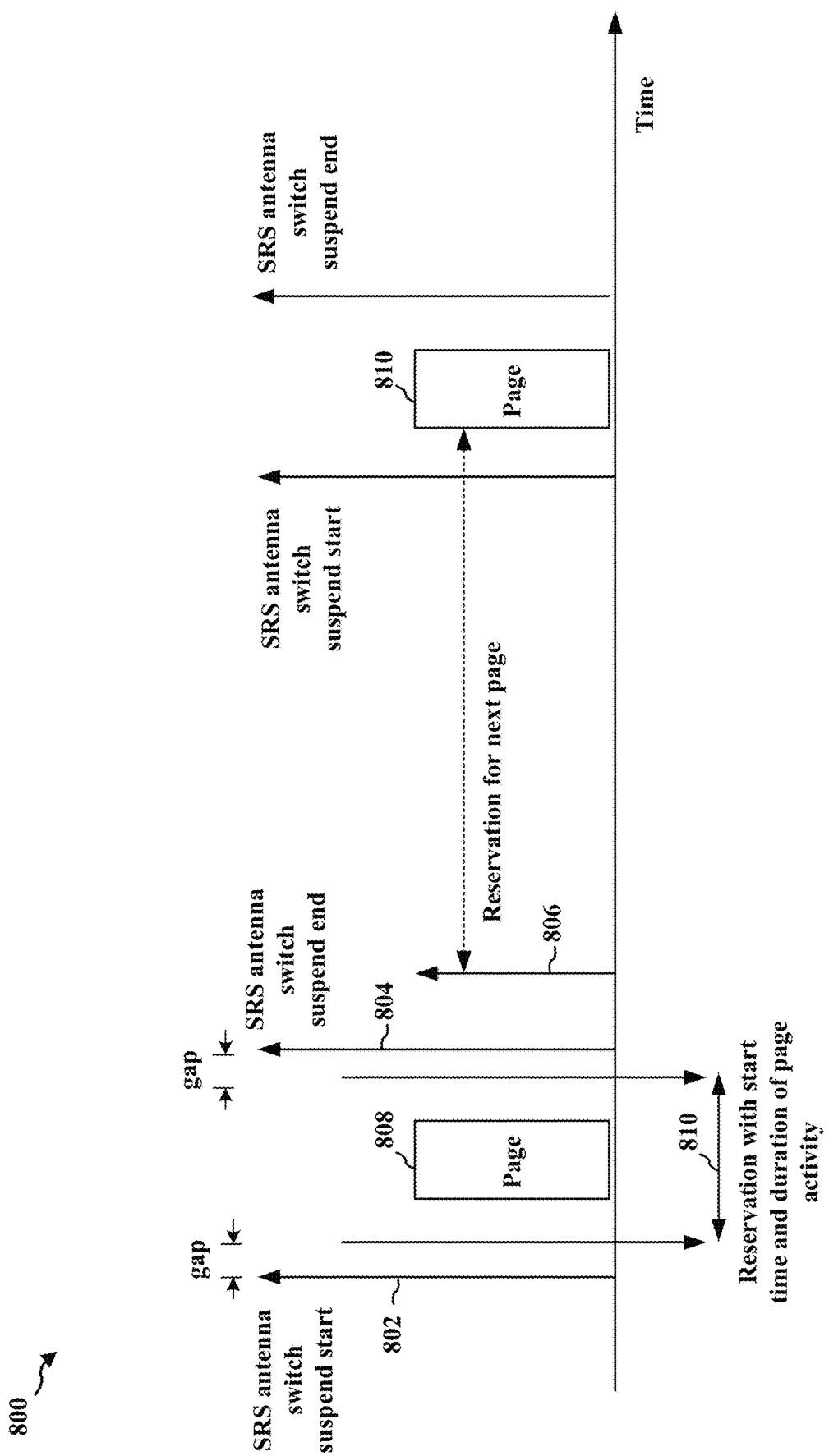
FIG. 8 illustrates an example timeline that includes a suspension of SRS antenna switching for a first SIM during a period of time that a second SIM monitors for a page, according to some embodiments.

FIG. 8 illustrates an example timeline 800 for altering or modifying MSIM concurrent operation. In the illustrated example, the timeline 800 includes temporarily suspending concurrent SRS antenna switching on a first SIM while a second SIM monitors for a page 808. While the concept is presented using the example of monitoring for a page, the principle may be extended to other idle mode activities that may be performed by a second SIM, such as measurements, cell acquisition, receiving system information, among other examples.

In some scenarios, paging operations can be managed for concurrent SIM operations.

For example, the second SIM may indicate to a component of the UE that interacts with multiple SIMs of the UE, such as the transceiver management component 512, a period of time during which the second SIM will monitor for a page 808. The second SIM may indicate a reservation period 810. The reservation period may include a start time and a duration that the second SIM will monitor for the page 808. The transceiver management component 512 may send an indication 802 to the first SIM to suspend SRS antenna switching at a start time and may indicate to the first SIM to resume SRS antenna switching at an end time 804.

The transceiver management component 512 may provide a gap period of time for suspension of some MSIM operations. For example, time gaps may occur between the indicated start/end times for suspending the SRS antenna switching and the actual reservation period 810 during which the second SIM will monitor for a page 808. The gap may allow an amount of time for the first SIM to perform the suspension. The first SIM may still send SRS on a current antenna (such as a PRX antenna). Additionally, or alternatively, the first SIM may send data using the current antenna. However, the first SIM temporarily suspends antenna switching to send SRS on a different antenna based on the indication from the transceiver management component 512. The transceiver management component 512 may send an indication to the first SIM to suspend the antenna switching and may send another indication to the first SIM to resume the antenna switching when the second SIM's activity is completed.

Alternatively, the transceiver management component 512 may send an advance indication 806 to the first SIM. The advance indication 806 may indicate a current time, a start time for suspending antenna switching and an end time or a duration for the suspension of antenna switching. If the activity performed by the second SIM includes a periodic activity, the transceiver management component 512 may send an indication to the first SIM of a pattern for temporarily suspending SRS antenna switching while the second SIM performs the periodic activity.

Figure 9:
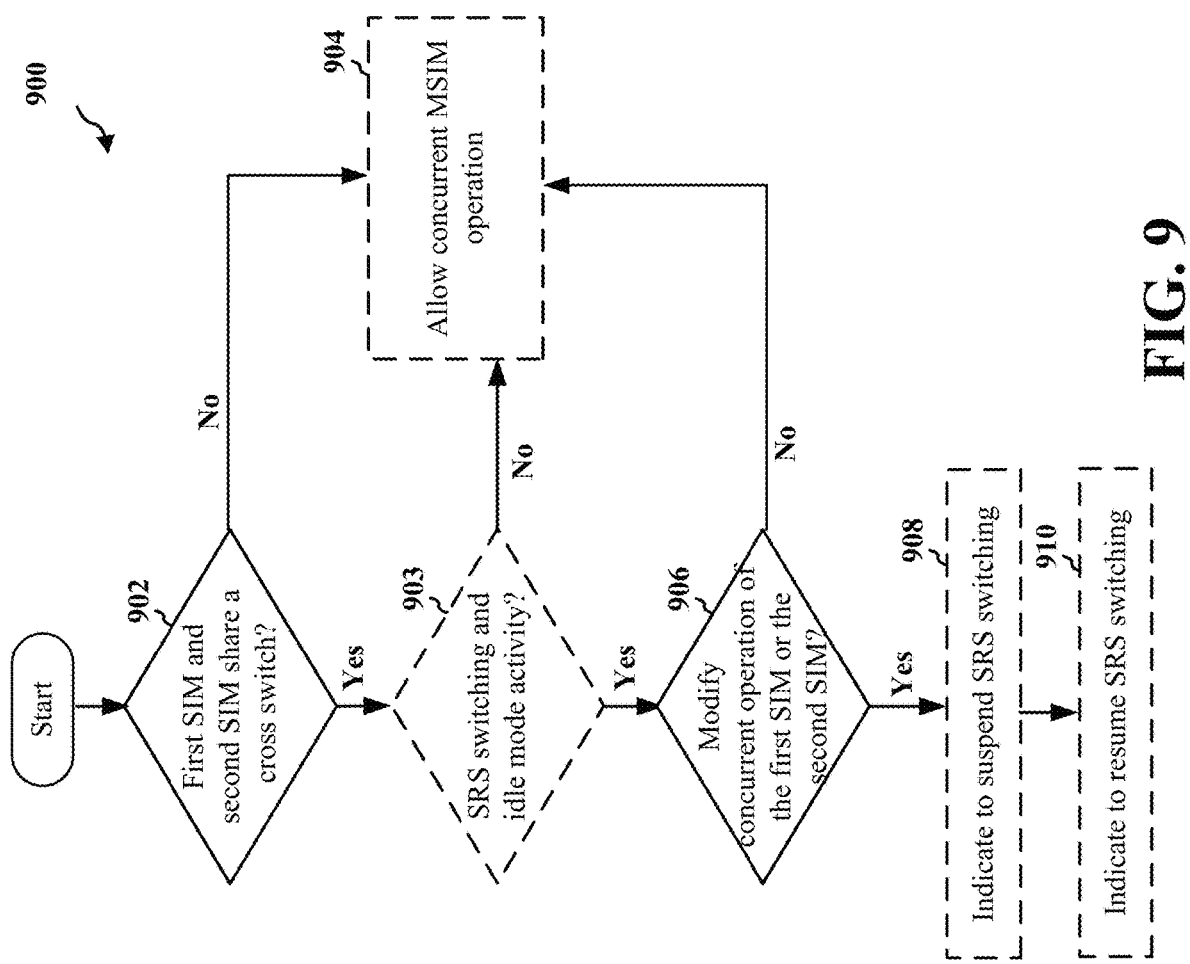
FIG. 9 is a flowchart of a method of wireless communication, according to some embodiments.

FIG. 9 is a flowchart of a method 900 of wireless communication. The method may be performed by a UE or a component of a UE (e.g., the UE 104, 350, 510; the apparatus 1002 or 1102, which may include the memory 360 and which may be the entire UE 104, 350, 510 or a component of the UE 104, 350, 510, such as the transceiver management component 512, the TX processor 368, the RX processor 356, and/or the controller/processor 359). Optional aspects of the method 900 are illustrated using a dashed line. The method may help to avoid degradation that one SIM may cause to reception of wireless communication by a second SIM during concurrent, MSIM operation at a UE.

At 902, the UE determines whether a first SIM and a second SIM of the UE share a cross switch. Sharing of a cross switch generally refers to SIMs being coupled to or otherwise in electrical communication with a common switch (e.g., a cross switch). The determination may be performed, for example, by the determination component 1008 of the apparatus 1002 or 1102. If the first SIM and the second SIM do not share a cross switch, such as in the independent cross switch example in FIG. 6, the UE may allow concurrent MSIM operation for the first SIM and the second SIM, as illustrated at 904. Concurrent MSIM operation includes operation of the first SIM that overlaps in time, at least partially, with operation of the second SIM. When the UE determines, at 902, that the first SIM and the second SIM of the UE do share a cross switch, such as in the example in FIG. 6, the UE may proceed to the determination at 906. The concurrent operation of the first SIM and the second SIM may the first SIM performing SRS antenna switching and the second SIM performing an idle mode activity. The concurrent operation of the first SIM and the second SIM may include the first SIM performing SRS carrier switching. Thus, the UE may determine whether a first SIM SRS carrier and the second SIM share an RF front end cross switch.

At 906, the UE may determine whether to modify concurrent operation of the first SIM or the second SIM based at least in part on a determination that the first SIM and the second SIM of the UE share the cross switch. For example, the UE may modify the concurrent operation by restricting operation, limiting operation, or otherwise adjusting operation of at least one of the SIMs. The determination may be performed, for example, by the modification component 1010 of the apparatus 1002 or 1102. The UE may determine whether to modify the concurrent operation of the first SIM or the second SIM further based on an operating band for the first SIM. The UE may determine whether to modify the concurrent operation of the first SIM or the second SIM further based on a number of antennas used for the SRS antenna switching. The UE may determine whether to modify the concurrent operation of the first SIM or the second SIM further based on a number of antennas used for the idle mode activity of the second SIM. For example, if the antennas used by the second SIM will be impacted by SRS switching or the antennas used for the second SIM idle operations will impact the first SIM SRS switching, the UE may determine to modify the concurrent operation of the first SIM and the second SIM, at 906. In some cases, although SIM 1 and SIM 2 share cross-switch, as determined at 902, the UE may determine not to suspend/resume SRS and to instead allow concurrent MSIM operation, e.g., at 904. For example, if the SIM 2 antenna or SIM 1 antenna will not be impacted by the concurrent activity, the UE may determine, at 906, to allow the concurrent MSIM operation without modification. The use of the number of antennas for the idle mode activity to make the determination at 906 accounts for different antenna and cross-switch RF front-end topology for different UEs. For example, in a five-antenna design topology, if SIM 2 uses one-antenna (e.g. ant-1 out of ant-1,2,3,4,5) and SIM 1 uses four antenna (e.g. ant-2,3,4,5 out of ant-1,2,3,4,5), it may be possible under some design configurations with cross-switch sharing to allow SIMI SRS switching concurrently with the SIM 2 idle mode operation without either limiting the SRS of SIM 1 or the idle mode operation of SIM 2.

The UE may determine whether to modify the concurrent operation of the first SIM or the second SIM further based on a type of activity performed by the second SIM. As illustrated at 903, in some examples, the UE may determine whether concurrent operation will occur, e.g., whether SRS switching (such as SRS antenna switching or SRS carrier switching) for the first SIM will overlap in time with an idle mode activity for the second SIM. The determination that a concurrent operation of the first SIM to perform sounding reference signal (SRS) switching and the second SIM to perform an idle mode activity may be performed, e.g., by the determination component 1008 of the apparatus 1002 or 1102. For example, the UE may modify (e.g., restrict, limit, or adjust) the SRS antenna switching by the first SIM if the second SIM is performing at least one of monitoring for a page in an idle mode, performing a cell acquisition, performing a measurement, receiving system information. Alternatively, the UE may modify (e.g., restrict or limit) the idle mode activity performed by the second SIM based on the idle mode activity having a lower priority than the SRS antenna switching.

If the UE determines to modify concurrent operation of the first SIM or the second SIM, at 906, the UE may indicate to the corresponding SIM to suspend an activity. For example, at 908, the UE may indicate to the first SIM to suspend the SRS antenna switching from a current antenna for a period of time. The indication may be performed, for example, by the indication component 1012 of the apparatus 1002 or 1102. FIG. 8 illustrates examples of the UE indicating to the first SIM to suspend SRS antenna switching, such as indication 802 or 806. If the UE does not determine to modify the concurrent operation of the first SIM and the second SIM, the UE may allow the concurrent MSIM operation, at 904.

In some examples, the UE may indicate, at 910, to the first SIM to resume the SRS antenna switching when the second SIM has completed the idle mode activity. The indication may be performed, for example, by the indication component 1012 of the apparatus 1002 or 1102. FIG. 8 illustrates an example indication of an end time 804 to end the suspension of SRS antenna switching. Alternatively, the UE may provide the first SIM with a start time for suspending the SRS antenna switching and an end time for resuming the SRS antenna switching. FIG. 8 illustrates an example indication 806 about suspension of SRS antenna switching that may include a start time and duration for the suspension.

Figure 10:
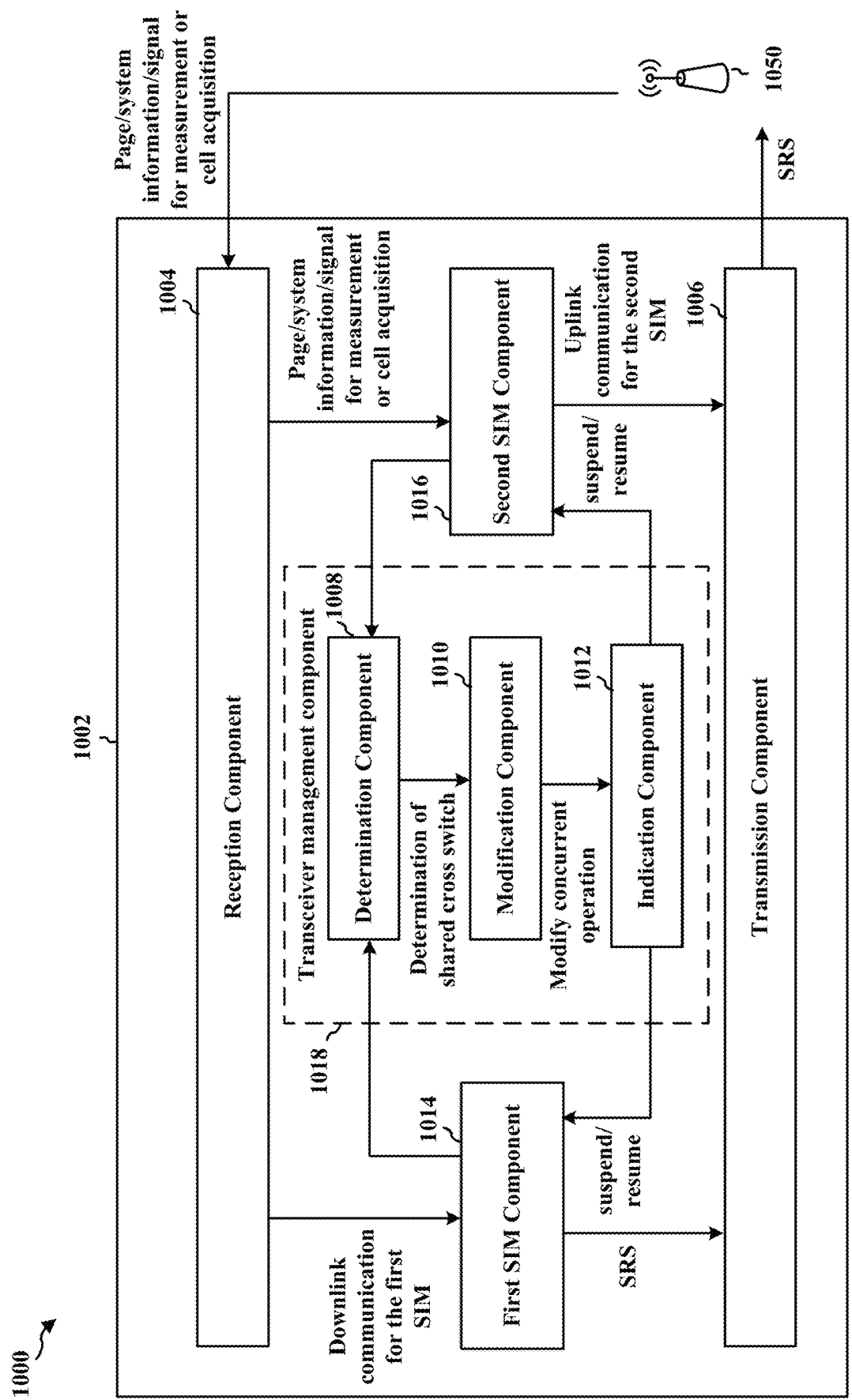
FIG. 10 is a conceptual data flow diagram illustrating the data flow between different means/components in an example apparatus, according to some embodiments.

FIG. 10 is a conceptual data flow diagram 1000 illustrating the data flow between different means/components in an example apparatus 1002. The apparatus 1002 may be a UE or a component of a UE. The apparatus includes a reception component 1004 that is configured to receive downlink communication from at least one base station 1050, and a transmission component 1006 that is configured to transmit uplink communication to at least one base station 1050. The apparatus 1002 includes a determination component 1008 that is configured to determine whether a first SIM and a second SIM of the UE share a cross switch, such as described in connection with 902 in FIG. 9. If the determination component 1008 determines that first SIM and the second SIM do not share a cross switch, the apparatus may allow concurrent MSIM operation of a first SIM component 1014 and a second SIM component 1016. The determination component 1008 may be configured to determine a concurrent operation of the first SIM to perform SRS switching and the second SIM to perform an idle mode activity, e.g., as described in connection with 903 in FIG. 9. The apparatus 1002 includes a modification component 1010 that is configured to determine whether to modify concurrent operation of the first SIM or the second SIM based at least in part on a determination that the first SIM and the second SIM of the UE share the cross switch, such as described in connection with 904 in FIG. 9. For example, the modification component 1010 may determine to modify (e.g., restrict, limit, or adjust) SRS antenna switching by the first SIM component 1014 while the second SIM component 1016 is performing at least one of monitoring for a page in an idle mode. Alternatively, the modification component 1010 may determine to modify (e.g., restrict, limit, or adjust) the idle mode activity performed by the second SIM component 1016 based on the idle mode activity having a lower priority than the SRS antenna switching of the first SIM component 1014. The apparatus 1002 may include an indication component 1012 that is configured to indicate to the corresponding SIM to suspend an activity, if the modification component 1010 determines to restrict concurrent operation of the first SIM component 1014 or the second SIM component 1016. For example, the indication component may indicate to the first SIM to suspend the SRS antenna switching from a current antenna for a period of time. The indication component 1012 may indicate to the corresponding SIM to resume the concurrent activity. In some examples, the determination component, the modification component, and/or the indication component may be components of a transceiver management component 1018.

The apparatus 1002 may include additional components that perform each of the blocks of the algorithm in the aforementioned flowchart of FIG. 9. As such, each block in the aforementioned flowcharts of FIG. 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
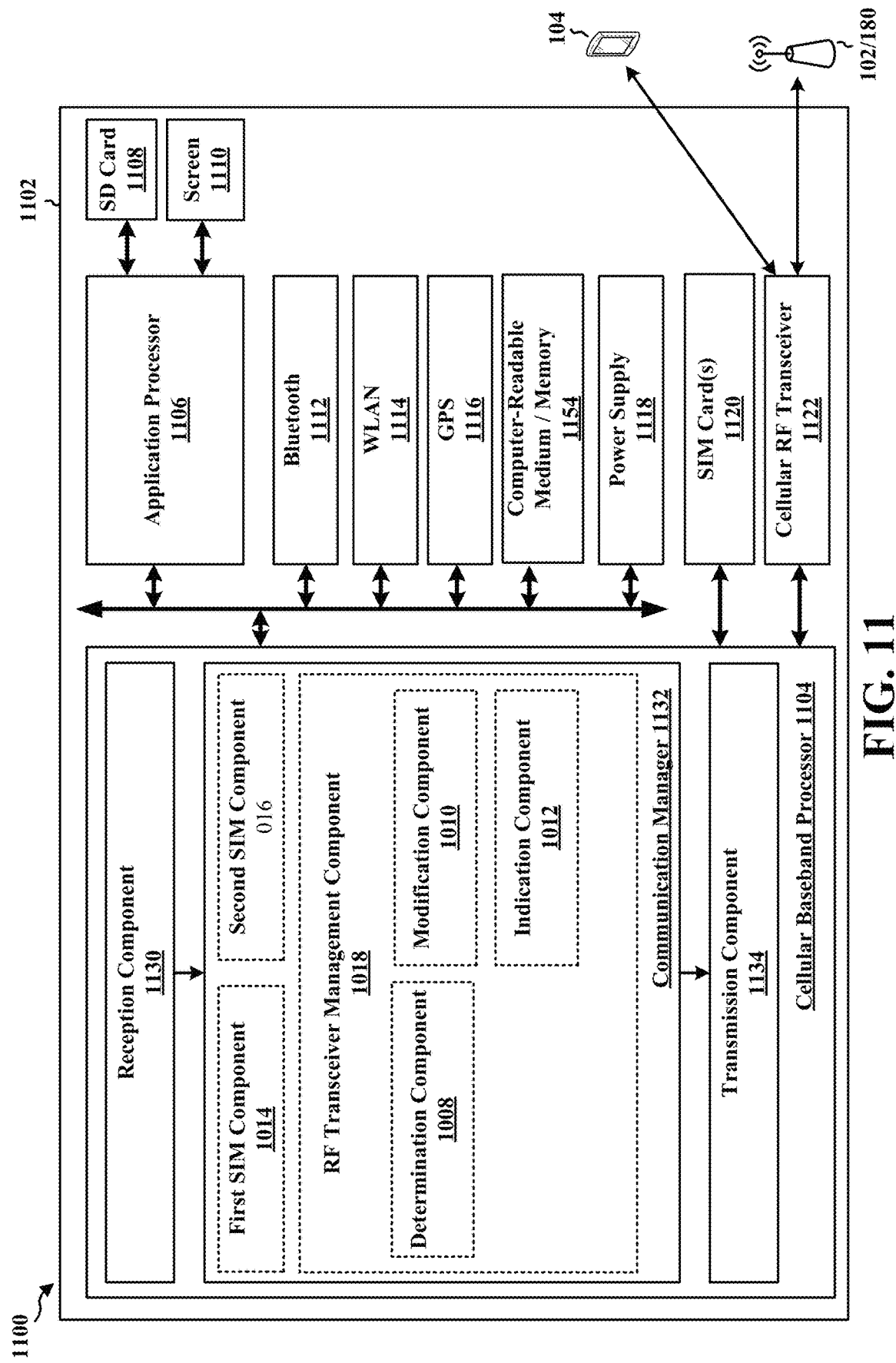
FIG. 11 is a diagram illustrating an example of a hardware implementation for an apparatus employing a processing system, according to some embodiments.

FIG. 11 is a diagram 1100 illustrating an example of a hardware implementation for an apparatus 1102 employing a processing system. The apparatus 1102 may correspond to the apparatus 1002 and may be a UE or a component of a UE. The apparatus 1102 includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the base station 102/180 and/or UE 104. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include the first SIM component 1014, the second SIM component 1016, the RF transceiver management component 1018, the determination component 1008, the modification component 1010, and/or the indication component that are configured to perform the aspects described in connection with FIGS. 9 and 10.

Similar to the apparatus 1002, the apparatus 1102 may include additional components that perform each of the blocks of the algorithm in the aforementioned flowchart of FIG. 9. As such, each block in the aforementioned flowcharts of FIG. 9 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002 for wireless communication includes means for determining that a first SIM and a second SIM of the UE share a cross switch (e.g., the determination component 1008 of the transceiver management component 1018 in the apparatus 1002), means for determining a concurrent operation of the first SIM to perform SRS switching and the second SIM to perform an idle mode activity (e.g., the determination component 1008 of the transceiver management component 1018 in the apparatus 1002), and means for modifying the concurrent operation of the first SIM or the second SIM based at least in part on a determination that the first SIM and the second SIM of the UE share the cross switch (e.g., the modification component 1010 of the transceiver management component 1018 in the apparatus 1002). The apparatus may further include means for indicating to the first SIM to suspend the SRS antenna switching from a current antenna for a period of time (e.g., the indication component 1012 of the transceiver management component 1018 of the apparatus 1002). The apparatus may further include means for indicating to the first SIM to resume the SRS antenna switching when the second SIM has completed the idle mode activity (e.g., the indication component 1012 of the apparatus 1002). The aforementioned means may be one or more of the aforementioned components of the apparatus 1002 and/or the apparatus 1002 configured to perform the functions recited by the aforementioned means. As described supra, the means may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Aspect 1 is a method of wireless communication at a UE, comprising: determining that a first SIM and a second SIM of the UE share a cross switch; determining a concurrent operation of the first SIM to perform SRS switching and the second SIM to perform an idle mode activity; and modifying the concurrent operation of the first SIM or the second SIM based at least in part on a determination that the first SIM and the second SIM of the UE share the cross switch.

In aspect 2, the method of aspect 1 further includes that the concurrent operation of the first SIM and the second SIM includes the first SIM performing SRS antenna switching and the second SIM performing the idle mode activity.

In aspect 3, the method of aspect 1 or aspect 2 further includes modifying the concurrent operation of the first SIM or the second SIM further based on an operating band for the first SIM.

In aspect 4, the method of any of aspects 1-3 further includes that the UE determines whether to modify the concurrent operation of the first SIM or the second SIM further based on a number of antennas used for the SRS antenna switching.

In aspect 5, the method of any of aspects 1-4 further includes that the UE determines whether to modify the concurrent operation of the first SIM or the second SIM further based on a number of antennas used for the idle mode activity of the second SIM.

In aspect 6, the method of any of aspects 1-5 further includes that the concurrent operation of the first SIM and the second SIM includes the first SIM performing SRS carrier switching.

In aspect 7, the method of any of aspects 1-6 further includes that the UE determines whether to modify the concurrent operation of the first SIM or the second SIM further based on a type of activity performed by the second SIM.

In aspect 8, the method of any of aspects 1-7 further includes that the UE modifies the SRS switching by the first SIM if the second SIM is performing at least one of: monitoring for a page in an idle mode; performing a cell acquisition; performing a measurement; or receiving system information.

In aspect 9, the method of any of aspects 1-8 further includes that the UE modifies the idle mode activity performed by the second SIM based on the idle mode activity having a lower priority than the SRS switching.

In aspect 10, the method of any of aspects 1-9 further includes indicating to the first SIM to suspend the SRS switching from a current antenna for a period of time.

In aspect 11, the method of any of aspects 1-10 further includes indicating to the first SIM to resume the SRS switching when the second SIM has completed the idle mode activity.

In aspect 12, the method of any of aspects 1-10 further includes that the UE provides the first SIM with a start time for suspending the SRS switching and an end time for resuming the SRS switching.

Aspect 13 is a device including one or more processors and one or more memories in electronic communication with the one or more processors storing instructions executable by the one or more processors to cause the device to implement a method as in any of aspects 1-12.

Aspect 14 is a system or apparatus including means for implementing a method or realizing an apparatus as in any of aspects 1-12.

Aspect 15 is a non-transitory computer readable medium storing instructions executable by one or more processors to cause the one or more processors to implement a method as in any of aspects 1-12.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining that a first subscriber identity module (SIM) and a second SIM of the UE share a cross switch;
    determining a concurrent operation of the first SIM to perform sounding reference signal (SRS) switching and the second SIM to perform an idle mode activity; and
    modifying the concurrent operation of the first SIM to perform the SRS switching concurrently with the idle mode activity of the second SIM based at least in part on a determination that the first SIM and the second SIM of the UE share the cross switch.

2. The method of claim 1, wherein the concurrent operation of the first SIM and the second SIM includes the first SIM performing SRS antenna switching.

3. The method of claim 2, wherein the UE determines whether to modify the concurrent operation of the first SIM further based on a number of antennas used for the SRS antenna switching.

4. The method of claim 1, wherein the UE determines whether to modify the concurrent operation of the first SIM further based on a number of antennas used for the idle mode activity of the second SIM.

5. The method of claim 1, further comprising modifying the concurrent operation of the first SIM further based on an operating band for the first SIM.

6. The method of claim 1, wherein the concurrent operation of the first SIM and the second SIM includes the first SIM performing SRS carrier switching.

7. The method of claim 1, wherein the UE determines whether to modify the concurrent operation of the first SIM based on a type of activity performed by the second SIM.

8. The method of claim 7, wherein the UE modifies the SRS switching by the first SIM if the second SIM is performing at least one of:
    monitoring for a page in an idle mode;
    performing a cell acquisition;
    performing a measurement; or
    receiving system information.

9. The method of claim 7, further including modifying an additional idle mode activity performed by the second SIM concurrently with the SRS switching of the first SIM based on the additional idle mode activity having a lower priority than the SRS switching.

10. The method of claim 1, further comprising:
    indicating to the first SIM to suspend the SRS switching from a current antenna for a period of time.

11. The method of claim 10, further comprising:
    indicating to the first SIM to resume the SRS switching when the second SIM has completed the idle mode activity.

12. The method of claim 10, wherein the UE provides the first SIM with a start time for suspending the SRS switching and an end time for resuming the SRS switching.

13. An apparatus for wireless communication at a user equipment (UE), comprising:
    a memory; and
    at least one processor coupled to the memory and configured to:

determine that a first subscriber identity module (SIM) and a second SIM of the UE share a cross switch;

determine a concurrent operation of the first SIM to perform sounding reference signal (SRS) switching and the second SIM to perform an idle mode activity; and modify the concurrent operation of the first SIM to perform the SRS switching concurrently with the idle mode activity of the second SIM based at least in part on a determination that the first SIM and the second SIM of the UE share the cross switch.

14. The apparatus of claim 13, wherein the concurrent operation of the first SIM and the second SIM includes the first SIM performing SRS antenna switching.

15. The apparatus of claim 14, wherein the at least one processor is configured to determine whether to modify the concurrent operation of the first SIM further based on at least one of a first number of antennas used for the SRS antenna switching or a second number of antennas used for the idle mode activity of the second SIM.

16. The apparatus of claim 13, wherein the at least one processor is configured to modify the concurrent operation of the first SIM further based on an operating band for the first SIM.

17. The apparatus of claim 13, wherein the concurrent operation of the first SIM and the second SIM includes the first SIM performing SRS carrier switching.

18. The apparatus of claim 13, wherein the at least one processor is configured to determine whether to modify the concurrent operation of the first SIM further based on a type of activity performed by the second SIM.

19. The apparatus of claim 18, wherein the at least one processor is configured to modify the SRS switching by the first SIM if the second SIM is performing at least one of:
 monitoring for a page in an idle mode;
 performing a cell acquisition;
 performing a measurement; or
 receiving system information.

20. The apparatus of claim 18, wherein the at least one processor is configured to modify an additional idle mode activity performed by the second SIM concurrently with the SRS switching of the first SIM based on the additional idle mode activity having a lower priority than the SRS switching.

21. The apparatus of claim 13, wherein the at least one processor is further configured to:
 indicate to the first SIM to suspend the SRS switching from a current antenna for a period of time.

22. The apparatus of claim 19, wherein the at least one processor is further configured to:
 indicate to the first SIM to resume the SRS switching when the second SIM has completed the idle mode activity.

23. The apparatus of claim 19, wherein the at least one processor is configured provide the first SIM with a start time for suspending the SRS switching and an end time for resuming the SRS switching.

24. An apparatus for wireless communication at a user equipment (UE), comprising:
 means for determining that a first subscriber identity module (SIM) and a second SIM of the UE share a cross switch;
 means for determining a concurrent operation of the first SIM to perform sounding reference signal (SRS) switching and the second SIM to perform an idle mode activity; and
 means for modifying the concurrent operation of the first SIM to perform the SRS switching concurrently with the idle mode activity of the second SIM based at least in part on a determination that the first SIM and the second SIM of the UE share the cross switch.

25. The apparatus of claim 24, wherein the concurrent operation of the first SIM and the second SIM includes the first SIM performing sounding reference signal (SRS) antenna switching.

26. The apparatus of claim 25, wherein the apparatus is configured to determine whether to modify the concurrent operation of the first SIM further based on at least one of a first number of antennas used for the SRS antenna switching or a second number of antennas used for the idle mode activity of the second SIM.

27. The apparatus of claim 24, wherein the apparatus is configured to modify the concurrent operation of the first SIM further based on an operating band for the first SIM.

28. The apparatus of claim 24, wherein the concurrent operation of the first SIM and the second SIM includes the first SIM performing SRS carrier switching.

29. The apparatus of claim 24, wherein the apparatus is configured to determine whether to modify the concurrent operation of the first SIM further based on a type of activity performed by the second SIM, wherein the apparatus is configured to modify the SRS switching by the first SIM if the second SIM is performing at least one of:
 monitoring for a page in an idle mode;
 performing a cell acquisition;
 performing a measurement; or
 receiving system information.

30. A non-transitory computer-readable medium storing computer executable code for wireless communication at a user equipment (UE), the code when executed by a processor cause the processor to:
 determine that a first subscriber identity module (SIM) and a second SIM of the UE share a cross switch;
 determine a concurrent operation of the first SIM to perform sounding reference signal (SRS) switching and the second SIM to perform an idle mode activity; and
 modify the concurrent operation of the first SIM to perform the SRS switching concurrently with the idle mode activity of the second SIM based at least in part on a determination that the first SIM and the second SIM of the UE share the cross switch.

* * * * *